(12) United States Patent
Mao et al.

(10) Patent No.: US 9,559,411 B2
(45) Date of Patent: Jan. 31, 2017

(54) METHOD FOR PRODUCING INFRARED ZNS DOMES

(71) Applicant: Shanghai Institute of Optics and Fine Mechanics, Chinese Academy of Sciences, Shanghai (CN)

(72) Inventors: Xiaojian Mao, Shanghai (CN); Baoyan Chai, Shanghai (CN); Long Zhang, Shanghai (CN); Benxue Jiang, Shanghai (CN); Qiang Yuan, Shanghai (CN); Junxi Xie, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 14/949,801

(22) Filed: Nov. 23, 2015

(65) Prior Publication Data
US 2016/0204505 A1    Jul. 14, 2016

Related U.S. Application Data

(63) Continuation of application No. PCT/CN2015/071681, filed on Jan. 28, 2015.

(30) Foreign Application Priority Data

Jan. 9, 2015   (CN) .......................... 2015 1 0011381

(51) Int. Cl.
*H01Q 1/42*   (2006.01)
*C04B 35/645*   (2006.01)
*C04B 35/547*   (2006.01)

(52) U.S. Cl.
CPC ............... *H01Q 1/42* (2013.01); *C04B 35/547* (2013.01); *C04B 35/6455* (2013.01)

(58) Field of Classification Search
CPC ............... C04B 35/547; C04B 35/6455; C04B 2235/446; H01Q 1/42
See application file for complete search history.

(56) References Cited

U.S. PATENT DOCUMENTS

| | | | |
|---|---|---|---|
| 3,131,238 A * | 4/1964 | Carnall, Jr. ............... | G02B 1/02 264/1.21 |
| 3,364,525 A * | 1/1968 | Davy ...................... | B29C 43/00 264/1.23 |
| 3,589,880 A * | 6/1971 | Clark .................... | C03B 40/033 264/1.22 |
| 4,499,049 A * | 2/1985 | Hanejko ................... | B22F 3/15 419/49 |
| 6,111,689 A * | 8/2000 | Shibata ................. | C04B 35/547 264/1.21 |

(Continued)

FOREIGN PATENT DOCUMENTS

| GB | 934421 A | 8/1963 |
|---|---|---|
| JP | H07-242910 A | 9/1995 |

*Primary Examiner* — Erin Snelting
(74) *Attorney, Agent, or Firm* — Mei & Mark LLP; Manni Li

(57) ABSTRACT

A method for producing infrared ZnS domes comprises forming green body by CIP and sintering by hot pressing. In the present invention, the pressure transfers through inert particles hence distributes uniformly while the shape of the dome is controlled by a lower punch head. The ZnS ceramic domes produced by the method of the present invention are of uniform infrared properties with high yield.

5 Claims, 4 Drawing Sheets

(56) References Cited

U.S. PATENT DOCUMENTS

| | | | | |
|---|---|---|---|---|
| 8,110,140 B2* | 2/2012 | Hasegawa | | C04B 35/547 264/603 |
| 2010/0079842 A1* | 4/2010 | Dunleavy | | B82Y 20/00 359/245 |
| 2013/0271610 A1* | 10/2013 | Rozenburg | | G02B 1/02 348/164 |
| 2014/0203461 A1* | 7/2014 | Ravichandran | | B82Y 20/00 264/1.7 |

* cited by examiner

-- PRIOR ART --

METHOD FOR PRODUCING INFRARED ZnS DOMES

CROSS-REFERENCE TO RELATED APPLICATIONS

The subject application is a continuation of PCT international application PCT/CN2015/071681 filed on Jan. 28, 2015, which in turn claims priority on Chinese patent applications CN 201510011381.8 filed on Jan. 9, 2015. The contents and subject matter of the PCT and Chinese priority applications are incorporated herein by reference.

FIELD OF THE INVENTION

The present invention relates to the field of producing infrared domes, and more specifically, to an improved method to manufacture infrared-transparent ZnS ceramic domes.

BACKGROUND OF THE INVENTION

Infrared detection technology plays very important roles in the modern national defense technology, such as missile guidance, infrared observation, targeting, and other areas. Infrared dome is an important component for the missile seeker, which protects the internal components of the system and transfers the infrared signal at the same time. ZnS is common material for both mid-wave and long-wave infrared domes because of its wide transmittance range. At present, chemical vapor deposition (CVD) and hot pressing sintering are the main methods for ZnS manufacture. The CVD method can yield products with good optical quality, but the growth period is long and the cost is high. The CVD method is suitable for the growth of flat products but have difficulty for domes with cavities.

Hot pressing sintering, another technique for producing ZnS, is short in production cycle. However, the method is suitable for flat sheet with uniform thickness. FIG. 1 shows the schematic section view of the existing technology for ZnS production by hot pressing sintering.

The hot pressing mold 20 consists of outer die 23, upper punch 21, and lower punch 22. The flat pressing ZnS product is restricted in the space surrounded by outer die 23, upper punch 21, and lower punch 22. During the sintering process, the hydraulic pressure is transmitted to the upper punch 21 and the lower punch 22, and hence compresses the products. However, for uneven samples, especially for the domes with cavities, the main issue for hot pressing sintering is the difference in compress ratio, resulted from the variation of thickness along the pressing direction. The thin part with large compress ratio is compressed strongly, while contrary for the thick part. So, such difference will leads to pressure variation, as well as micro-structure and property variation on products. Generally, the pressure of ZnS hot pressing is very high. For example, in "Hot pressing polycrystalline ZnS," New Inorganic Materials, 1978, 45-47, ZnS with transmittance at 8-14 μm was prepared by hot pressing sintering under 300-400 MPa at 700-850° C. JP61-205659 (1986.9.11) discloses the hot pressing of infrared polycrystalline ZnS under 146-292 MPa at 770-965° C. Under such high pressure, the difference in compress ratio will often causes residual stress and cracks. Therefore, it is difficult to obtain infrared transparent ZnS domes with uniform microstructures and properties. In the present technology, high temperature alloy materials are usually used as hot pressing mold, such as GB934421A (hot pressing polycrystalline zinc sulfide, the Journal of inorganic materials 1973-3-25), metal molybdenum, GH4049, K403, GH4037, pyromet 625, etc. The purity of ZnS powders for infrared materials is no less than 99.95% with metal ion impurity content <0.01%, according to the disclosed prior art.

JPH07242910A discloses a hot pressing sintering method using flowable particles to transfer pressure, in which the products are embodied in high melting point particles. However, in the method, the compress ratios are different in pressure direction and the vertical direction. Secondly, the method cannot be used in the manufacture of sintered bodies with cavities, such as the domes, because of different compress ratios. Furthermore, the products need to be pre-sintered without pressure in the method. However, the cubic ZnS transforms to hexagonal wurtzite phase when the temperature is elevated up to 1020° C. The ZnS powder cannot be pre-sintered evidently under the transform point without external pressure. Hence, the method cannot be used to manufacture infrared ZnS domes.

SUMMARY OF THE INVENTION

To overcome the problem of the existing technologies for hot pressing sintering the infrared ZnS ceramic domes, the present invention provides a method for producing infrared ZnS domes. The method of the present invention transfers pressure by inert particles from outer surface, leading to uniform pressure, and gets homogenous dome products correspondingly.

The present invention provides a method for producing infrared ZnS domes including the following steps:
(a) Forming a green body of a dome from ZnS powders by cold isostatic pressing;
(b) Assembling the green body with a matched lower punch head and installing them on the lower punch inside the outer die of a hot pressing mold, then filling in inert particles between the outer die and the green body followed by installing the upper punch;
(c) Hot pressing sintering under the pressure of 200-400 MPa at 750-950° C. for 30-120 min in a vacuum pressing furnace with gaseous pressure lower than 1 Pa; and
(d) After sintering, taking out the infrared ZnS dome from the hot pressing mold.

In the present invention, the green body of a dome is formed by cold isostatic pressing as follows: making a rigid mold and an elastic mold according to the dome needed; installing the rigid mold and the elastic mold and filling the ZnS powders into the feed space from the feed inlet in the elastic mold; coving the feed inlet by an elastic plug seal followed by sealing inside an elastic vacuum bag; and cold isostatic pressing the sealed mold up to 200 MPa.

In the present invention, the inert particles are graphite particles or hexagonal boron nitride particles, or a mixture thereof.

In the present invention, the size of the inert particles is 20-100 mesh.

In further aspect of the present invention, an upper punch head is arranged between the upper punch and the inert particles. The lower surface of the upper punch head is adapted to the outer surface of the dome products, while the upper surface is flat and contacts with the lower surface of the upper punch, and its cylinder matches the outer die loosely.

In the present invention, the position of the lower punch head is fixed by setting a location recess in the upper surface of the lower punch and a corresponding location bulge in the lower surface of the lower punch head.

In further aspect of the present invention, the hot pressing sintered ZnS ceramic domes are treated by hot isostatic pressing at 800-900° C. under 200 MPa.

The ZnS ceramic domes produced by the method of the present invention are of uniform infrared properties with high yield. The technique is also suitable for the hot pressing of ZnSe and $MgF_2$ domes which need similar sintering condition.

In the figures, reference numbers correspond to the following structure:

01—elastic mold, 02—feed inlet, 03—elastic plug seal, 04—rigid mold, 05—feed space, 10—green body of a dome, 11—gap, 20—hot pressing mold, 21—upper punch, 22—lower punch, 23—outer die, 27—location recess, 30—inert particles, 40—lower punch head, 47—location bulge, 50—upper punch head.

DETAILED DESCRIPTION AND PREFERRED EMBODIMENTS OF THE INVENTION

The present invention is further illustrated in the examples and figures, but the scope of protection of the present invention are not limited to the examples and figures. One of skilled in the art may modify the present invention illustrated in the examples without departing from the scope of the present invention.

Example 1

Figure 1:
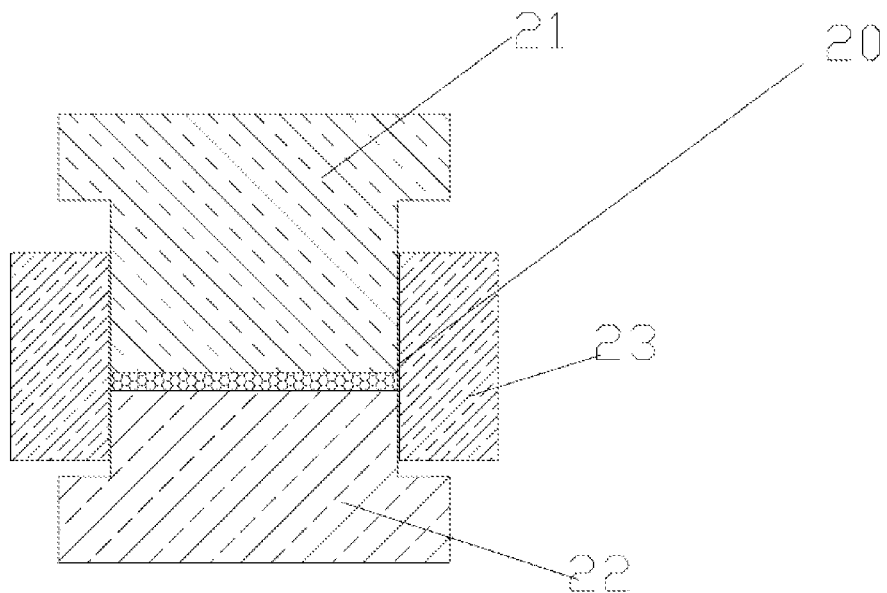
FIG. 1 is a schematic sectional view of the existing technology for ZnS production by hot pressing sintering.
Figure 2:
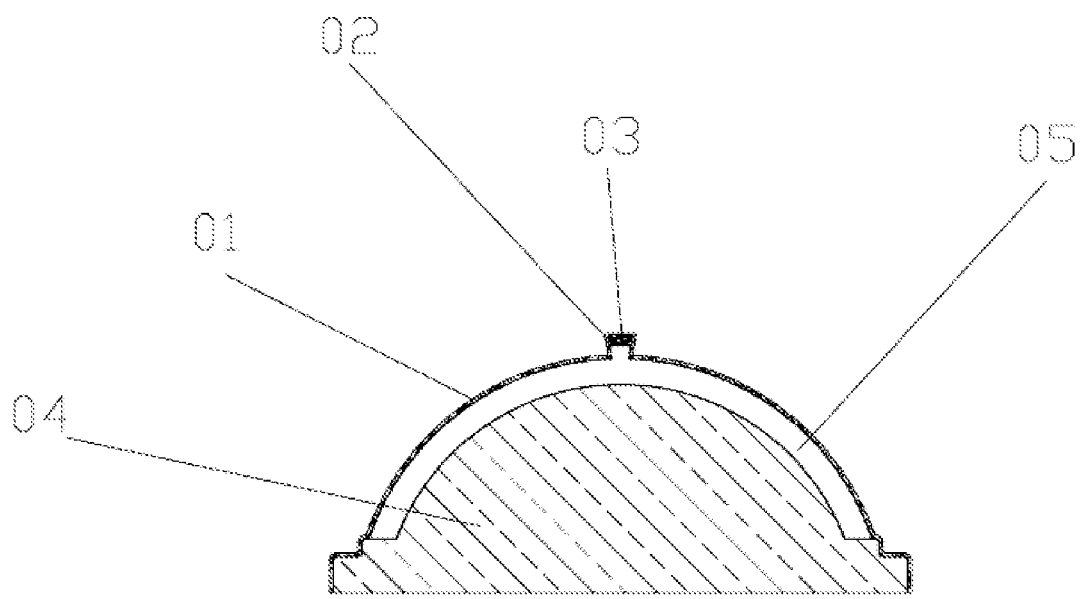
FIG. 2 is a schematic sectional view for forming the green body of ZnS dome by cold isostatic pressing in the present invention.

A method for producing infrared ZnS domes includes following steps: firstly, a green body of a dome 10 from ZnS powders is shaped by cold isostatic pressing. FIG. 2 shows the schematic sectional view for forming the green body of ZnS dome. The ZnS powder is purchased from the Aladdin Company, with the particle size of 3.3-4.3 μm and the purity ≥99.99%. A rigid mold 04 and an elastic mold 01 according to the dome needed are prepared. The rigid mold 04 and the elastic mold 01 are installed forming a feed space 05. ZnS powder is filled into the feed space 05 from the feed inlet 02 in the elastic mold 01 with vibration, followed by covering the feed inlet 02 with an elastic plug seal 03. The resultant assembly is sealed inside an elastic vacuum bag and pressed up to 200 MPa in the cold isostatic pressing chamber.

Figure 3:
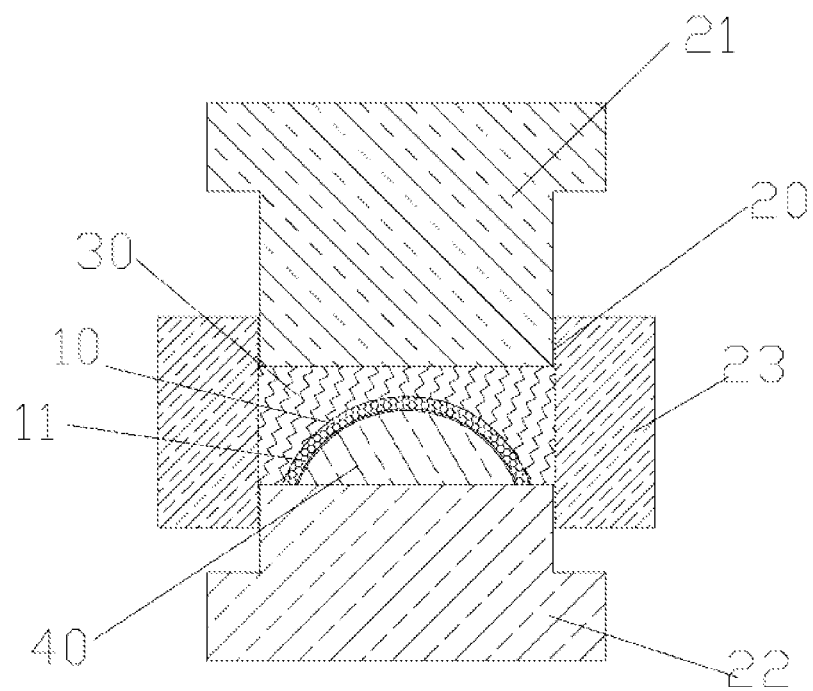
FIG. 3 is a schematic section view of hot pressing sintering in Example 1.

The alloy K403 is used to produce the mold. A lower punch head 40 is made by K403 which is matched with the inner surface of the green body of a dome 10. The surface is preferred to be coated with colloidal graphite or BN. The lower punch head 40 is assembled with the green body of the dome 10 with the gap between each other no larger than 0.2 mm, as shown in FIG. 3. Then, the lower punch head 40 combined with the green body of the dome 10 is put on lower punch 22 inside outer die 23, and covered by inert particles 30 on the green body of the dome 10. Afterwards, the upper punch 21 is installed in outer die 23 pressing on the inert particles 30. The lower surface of the lower punch head 40 is flat and contacts with the lower punch 22 in the center. The inert particles 30 are the machining byproducts of the CIP graphite, with the preferred size of 20-100 mesh.

The assembled mold as shown in FIG. 3 is installed in vacuum hot pressing furnace. The sintering is performed under the pressure of 350 MPa at 850° C. for 60 min with gaseous pressure lower than 1 Pa. After releasing the pressure and cooling down, an intact infrared ZnS dome is obtained.

Example 2

The procedure for dome shaping is the same as that in Example 1. The lower punch 22 includes a location recess 27 on the upper surface. The lower punch head 40 includes a location bulge 47 on the lower surface. The position of the lower punch head 40 is fixed by setting a location recess 27 and a corresponding location bulge 47.

Figure 4:
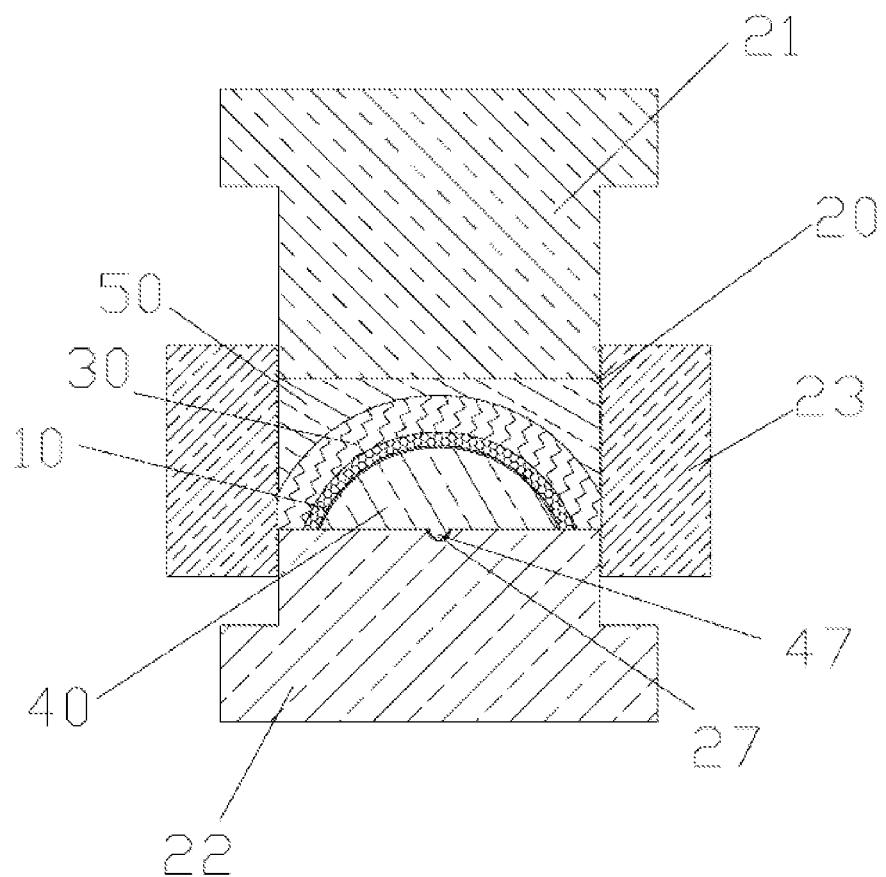
FIG. 4 is a schematic section view of hot pressing sintering in Example 2.

The assembled lower punch head 40 and the green body of a dome 10 are put into the hot pressing mold 20, as shown in FIG. 4. The position of the lower punch head 40 is fixed by setting a location recess 27 and a corresponding location bulge 47. Then, the inert particles 30, upper punch head 50, and upper punch 21 are installed in order. The lower surface of the upper punch head 50 is adapted to the outer surface of the green body of a dome 10, while the upper surface is flat and contacts with the lower surface of the upper punch 21, and its cylinder matches the outer die 23 loosely. The upper punch head 50 may reduce the expanding force of the outer die 23. The inert particles 30 are the machining byproducts of the hexagonal BN ceramic, with a preferred size of 20-100 mesh.

The assembled mold as shown in FIG. 4 is installed in vacuum hot pressing furnace. The sintering is performed under the pressure of 250 MPa at 950° C. for 30 min with gaseous pressure lower than 1 Pa. After releasing the pressure and cooling down, an intact infrared ZnS dome is obtained.

Example 3

Figure 5:
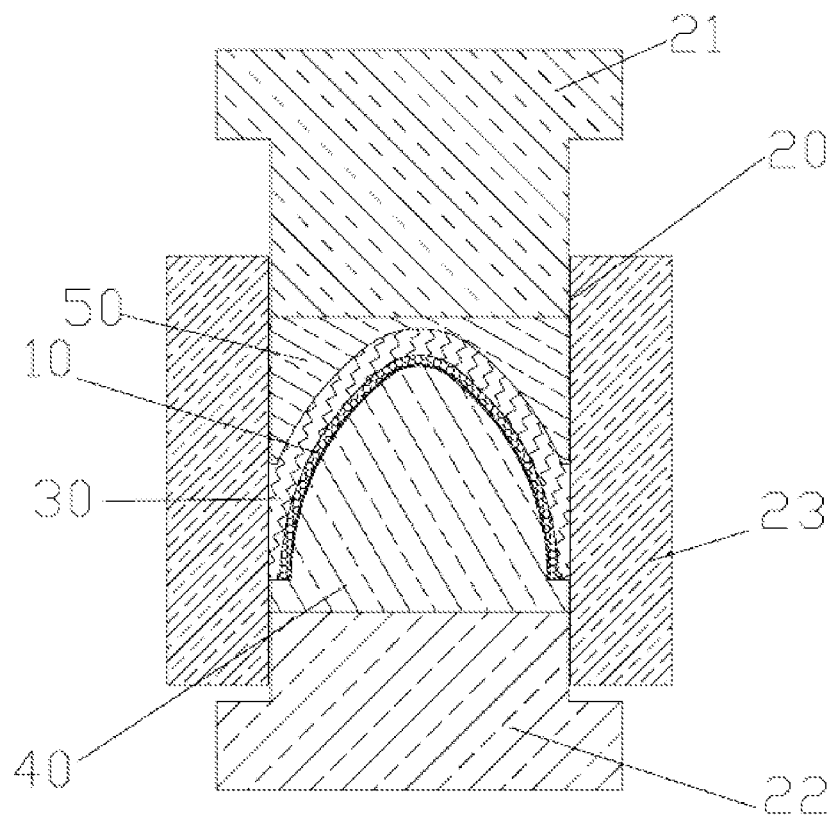
FIG. 5 is a schematic section view of hot pressing sintering in Example 3.

A green body of a dome 10 as shown in FIG. 5 is shaped by CIP described in Example 1. A lower punch head 40 is assembled with the green body of the dome 10 as shown in FIG. 5. The lower punch head 40 includes a cylinder which matches with the inner surface of the outer die 23 to fix the position of the lower punch head 40. The assembled lower punch head 40 and the green body of a dome 10 are put into the hot pressing mold 20, as shown in FIG. 5. Then, the inert particles 30, the upper punch head 50, and upper punch 21 are installed as described in Example 2. The inert particles 30 are the mixture of graphite and hexagonal BN mentioned in Examples 1 and 2.

The assembled mold as shown in FIG. 5 is installed in vacuum hot pressing furnace. The sintering is performed under the pressure of 200 MPa at 750° C. for 120 min with gaseous pressure lower than 1 Pa. After releasing the pressure and cooling down, an intact infrared ZnS dome is obtained.

Example 4

The ZnS dome produced by Example 3 is treated by hot isostatic pressing under 200 MPa at 850° C. for 120 min. The transmittance is advanced.

Flat samples are cut from different part of the domes and polished to 3 mm thick for transmittance measurement. The results are shown in the following table.

| Sample | | Transmittance (%) | | | | | | | |
| --- | --- | --- | --- | --- | --- | --- | --- | --- | --- |
| | | 1 μm | 2 μm | 3 μm | 4 μm | 6 μm | 8 μm | 10 μm | 12 μm |
| EX. 1 | center | 25 | 41 | 58 | 70 | 71 | 72 | 71 | 58 |
| | edge | 36 | 50 | 62 | 71 | 72 | 71 | 72 | 56 |
| EX. 2 | center | 33 | 50 | 65 | 70 | 72 | 73 | 72 | 61 |
| | edge | 38 | 53 | 68 | 72 | 72 | 72 | 72 | 59 |
| EX. 3 | center | 12 | 36 | 55 | 62 | 70 | 73 | 72 | 59 |
| | edge | 10 | 33 | 56 | 60 | 68 | 72 | 72 | 56 |
| EX. 4 | center | 63 | 67 | 74 | 74 | 74 | 73 | 73 | 61 |
| | edge | 65 | 68 | 73 | 74 | 74 | 74 | 72 | 62 |

The above examples are used to explain the technical scheme of the present invention; any general technical personnel in the field can modify or replace the technical scheme of the present invention within the spirit and scope of the present invention.

We claim:

1. A method for producing infrared ZnS domes comprising
    forming a green body of a dome from ZnS powders by cold isostatic pressing,
    assembling the green body with a matched lower punch head,
    installing the green body and the matched lower punch head on a lower punch inside an outer die of a hot pressing mold,
    filling in inert particles between the outer die and the green body, followed by installing an upper punch,
    hot pressing sintering the filled hot pressing mold under a pressure of 200-400 MPa at 750-950° C. for 30-120 min in a vacuum pressing furnace with gaseous pressure lower than 1 Pa, and
    taking out an infrared ZnS dome from the hot pressing mold,
    wherein the inert particles are graphite particles, hexagonal boron nitride particles, or a mixture thereof, and the size of the inert particles is at a range of 20-100 mesh.

2. The method for producing infrared ZnS domes according to claim 1, further comprising
    forming the green body of the dome from ZnS powders by cold isostatic pressing by the steps of
        making a rigid mold and an elastic mold according to the dome needed,
        installing the rigid mold and the elastic mold,
        filling the ZnS powders into a feed space from a feed inlet in the elastic mold,
        covering the feed inlet by an elastic plug seal,
        sealing in an elastic vacuum bag, and
        cold isostatic pressing the sealed mold at a pressure in a range that is up to 200 MPa.

3. The method for producing infrared ZnS domes according to claim 1, wherein an upper punch head is arranged between the upper punch and the inert particles,
    a lower surface of the upper punch head is adapted to an outer surface of the green body of the dome,
    an upper surface of the upper punch head is flat and contacts with a lower surface of the upper punch, and
    an outside cylinder surface of the upper punch head matches an inner cylinder surface of the outer die loosely.

4. The method for producing infrared ZnS domes according to claim 1, wherein the position of the lower punch head is fixed by setting a location recess in an upper surface of the lower punch and a corresponding location bulge in a lower surface of the lower punch head.

5. A method for producing infrared ZnS domes, comprising
    forming a green body of a dome from ZnS powders by cold isostatic pressing,
    assembling the green body with a matched lower punch head,
    installing the green body and the matched lower punch head on a lower punch inside an outer die of a hot pressing mold,
    filling in inert particles between the outer die and the green body, followed by installing an upper punch,
    hot pressing sintering the filled hot pressing mold under a pressure of 200-400 MPa at 750-950° C. for 30-120 min in a vacuum pressing furnace with gaseous pressure lower than 1 Pa,
    taking out an infrared ZnS dome from the hot pressing mold, and
    treating the infrared ZnS dome by hot isostatic pressing at 800-900° C. under a pressure of 200 MPa.

\* \* \* \* \*